Patented Sept. 22, 1931

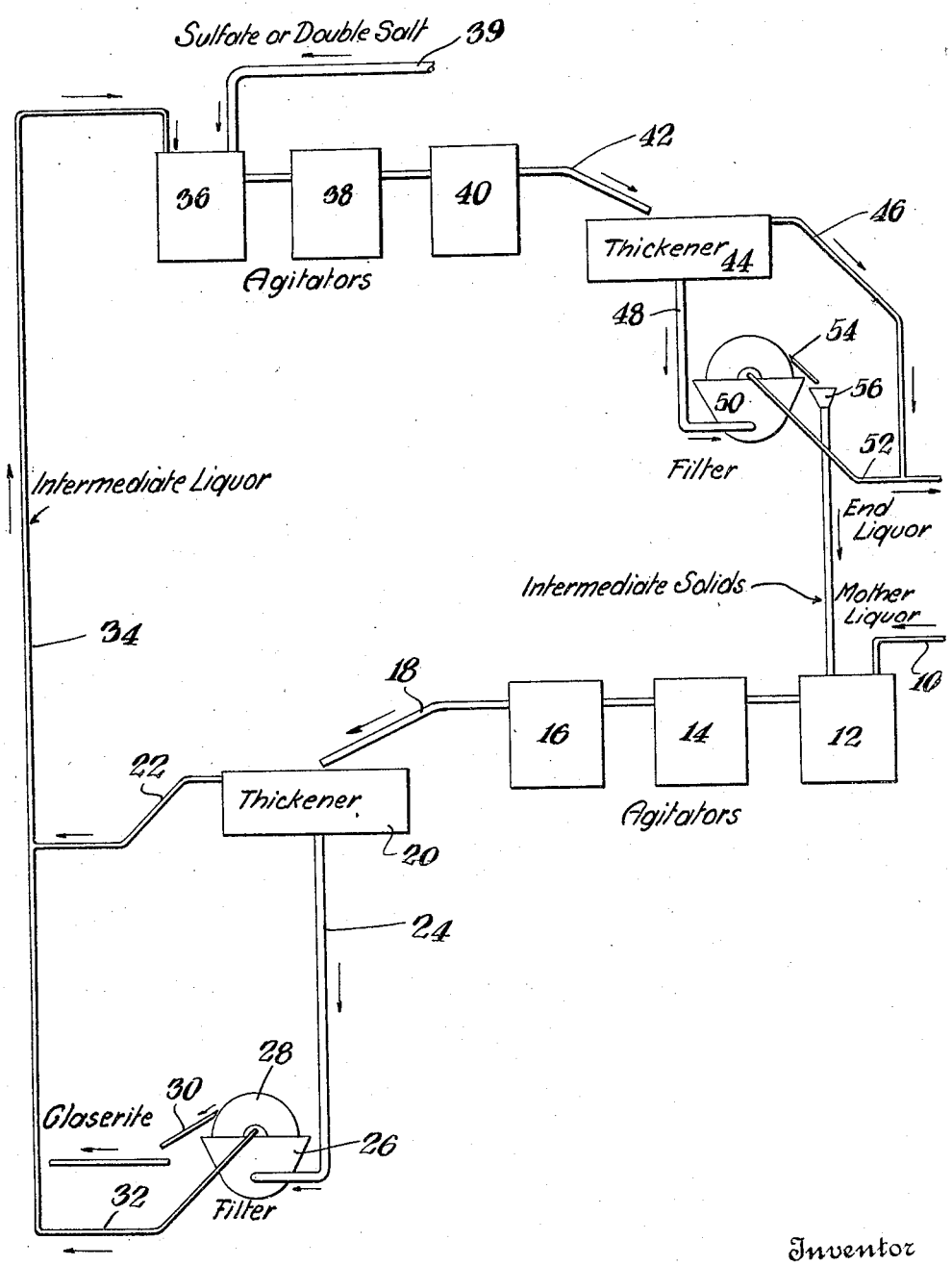

1,824,361

UNITED STATES PATENT OFFICE

HARRY WHEELER MORSE, OF REDWOOD CITY, CALIFORNIA

MANUFACTURE OF SULPHATE OF POTASH

Application filed April 29, 1929. Serial No. 359,108.

This invention relates to the recovery of potassium sulphate from potassium containing solutions, and in particular from Searles Lake liquor.

It is an object of my invention to provide a process whereby potassium may be conveniently recovered from solutions containing this element.

Another object is to provide a process whereby potassium sulphate may be recovered from the end liquor of Searles Lake brine.

A further object is to provide a process for the recovery of potassium in the form of Glaserite, $K_3Na(SO_4)_2$, from solutions containing potassium.

Other objects will appear as the description proceeds.

In the process of recovering potassium chloride and borax from Searles Lake brine, a hot concentrated liquor is produced containing about 19% of potassium chloride. This liquor is cooled for the separation by crystallization of the aforementioned salts. The resulting mother liquor contains about 10 to 11% of potassium chloride together with sodium chloride, sodium carbonate, sodium sulphate and borax. This mother liquor is sometimes returned to the evaporators where it is mixed with raw brine and reconcentrated.

I have discovered a process for the recovery of the potassium contained in this mother liquor, in the form of Glaserite, $K_3Na(SO_4)_2$. In carrying out this process, I add to the mother liquor mentioned above, anhydrous sodium sulphate, or a mixture containing substantial quantities of this salt, and agitate the solution for a relatively short period, whereupon a precipitate of crystals of Glaserite is obtained.

In my application Serial No. 351,331, filed March 30, 1929, I disclose a process for the separation of a double sulphate-carbonate of sodium from Searles Lake brine. This salt has been found to have the following approximate composition:

|  | Per cent |
|---|---|
| $Na_2CO_3$ | 29 |
| $Na_2SO_4$ | 68 |
| NaCl | 2 |

I have found that if this double sulphate-carbonate is used in solid form instead of anhydrous sodium sulphate, the same result is secured, although in this case the process may be somewhat less efficient, with a smaller recovery of potassium.

In the accompanying sheet of drawing, I have illustrated somewhat conventionally an arrangement of apparatus which is well adapted to carry out my process. It comprises in general, a two stage counter-current treatment, mother liquor high in potassium being caused to react with partially decomposed sulphate or sulphate-carbonate of sodium, and the intermediate liquor partly exhausted of its potassium content being caused to react with fresh anhydrous sulphate or sulphate-carbonate of sodium.

Mother liquor from the potassium chloride and borax crystallizing stage of a conventional Searles Lake brine treating plant is introduced into the system through conduit 10. It is received into a mixing chamber 12 where it is mixed with the intermediate solids, whose preparation will be presently described. In receptacles 12, 14 and 16, the mixture of mother liquor and solid salts is thoroughly agitated at a temperature of about 25° C., for a period of approximately two hours. From the last chamber 16, the mixture of liquor and solid salts flows through a conduit 18 into a thickener 20. After settling, the clear supernatant liquid flows off through pipe 22, while the thick sludge, comprising about 50% water, passes through conduit 24 into the pan 26 of a vacuum filter of conventional type. The crystals are here sucked as dry as possible on revolving drum 28, and are removed therefrom at 30. The filtrate is removed through pipe 32, and is joined with the liquid from pipe 22 in a common intermediate liquor conduit 34.

The solid salts collected on 30 consist of the double sulphate of potassium and sodium $K_3Na(SO_4)_2$ containing 38-40% $K_2O$. This double salt may, of course, be used in any way that may be desired, either directly in the form in which it is obtained as fertilizer, for example, or the potassium may be separated and used in a purified state.

The intermediate liquor which has been removed from the crystals is led through pipe 34 to a second mixing chamber 36. Here it is mixed with the anhydrous sodium sulphate previously mentioned, which I have shown conventionally as introduced through conduit 39. The partially exhausted mother liquor is thoroughly agitated with the solid salt in receptacles 36, 38 and 40. The temperature of the mixture is maintained at substantially 25° C., and the rate of flow is so regulated that the material will remain in the agitators for about two hours. The transformation from the sulphate to double sulphate is not complete at this stage due to the partially exhausted condition of the mother liquor. But by treating the liquor in two stages as I have outlined, a much more efficient separation of the potassium from the solution is possible.

From the third chamber 40 the mixture of exhausted mother liquor and solid salts passes through a conduit 42 into a thickener 44. After settling, the supernatant liquid is removed through pipe 46, while the sludge of crystals passes through conduit 48 to vacuum filter 50. The clear liquor from this filtrate is led off through pipe 52 which joins pipe 46. This end liquor may be returned to the evaporators for further concentration or may be otherwise disposed of. It may contain as little as 4.0 per cent of KCl.

The solids from filter 50, after being removed at 54, drop into a salt hopper 56, by means of which they are conducted to chamber 12 where they are moved with incoming mother liquor, thereby completing the cycle.

Instead of using anhydrous sodium sulphate at 36, I may, of desired, as previously indicated, use the sulphate-carbonate of sodium. This salt has the disadvantage that it does not reduce the potassium chloride content of the end liquor to as low a point as does the sulphate. Either salt or a mixture of the two in any desired proportion may, however, be used. The term "sodium sulphate" as used in the appended claims is intended to include either the pure or substantially pure salt or a mixture of this salt with other salts, in which mixture sodium sulphate is present in large proportion.

Instead of the mother liquor from a Searles Lake brine, any solution containing potassium chloride in concentration sufficient to produce a precipitate of potassium sodium sulphate under the conditions as described, may be employed.

As an example of operation, which is to be considered as purely illustrative, I have found it possible to treat in twenty-four hours 1360 tons of mother liquor, containing 10 percent of KCl, in apparatus of the following approximate dimensions: Agitators 12, 14 and 16 may be 12 feet high, and 12 feet in diameter. Thickener or settler 20 may be 25 feet in diameter and 8 feet deep. Filter 27 is of a capacity to handle 100 tons of solids, with an equal weight of filtrate, in 24 hours. Agitators 36, 38 and 40 may be 16 feet high and 14 feet in diameter, and thickener 44 is 30 feet in diameter and 8 feet deep. Filter 50 is capable of handling 125 tons of solids in 24 hours. Under these conditions, 150 tons of crude anhydrous $Na_2SO_4$ will be fed into the system each 24 hours, and 100 tons of the double salt will be recovered. The end liquor will contain about 4.0 per cent of KCl.

Many changes in the details of procedure could, of course, be made by any one familiar with the art. The apparatus which I have illustrated conventionally is intended merely to show one example of the manner in which my process can be carried out. I therefore desire my invention to be limited only by the prior art and the scope of the appended claims.

I claim:

1. A process for the recovery of potassium from a solution containing the same, comprising treating said solution in one stage with solid partially reacted sodium sulphate from a second stage, separating a double salt of sodium and potassium sulphates from the liquid, adding solid sodium sulphate to the liquid, allowing said sodium sulphate to react with said solution to form a precipitate of sodium sulphate partially reacted with potassium sulphate, separating solid partially reacted sodium sulphate from the liquid, and adding said partially reacted sodium sulphate to a fresh supply of solution in the first stage.

2. A process for the recovery of potassium from a solution containing the same, comprising treating said solution in one stage at a temperature of substantially 25° C. with solid partially reacted sodium sulphate from a second stage, separating a double salt of sodium and potassium sulphates from the liquid, adding solid sodium sulphate to the liquid, allowing said sodium sulphate to react with said solution to form a precipitate of sodium sulphate partially reacted with potassium sulphate, separating solid partially reacted sodium sulphate from the liquid, and adding said partially reacted sodium sulphate to a fresh supply of solution in the first stage.

3. A process for the recovery of potassium from a solution containing the same, comprising treating said solution in one stage with solid partially reacted sodium sulphate from a second stage, separating a double salt of sodium and potassium sulphates from the liquid, adding solid sodium sulphate to the liquid, allowing said sodium sulphate to react with said solution at a temperature of substantially 25° C. to form a precipitate of sodium sulphate partially reacted with potassium sulphate, separating solid partially reacted sodium sulphate from the liquid, and adding said partially reacted sodium sulphate to a fresh supply of solution in the first stage.

4. A process for the recovery of potassium from a solution containing the same, comprising treating said solution in one stage at a temperature of substantially 25° C. with solid partially reacted sodium sulphate from a second stage, separating a double salt of sodium and potassium sulphates from the liquid, adding solid sodium sulphate to the liquid, allowing said sodium sulphate to react with said solution at a temperature of substantially 25° C. to form a precipitate of sodium sulphate partially reacted with potassium sulphate, separating solid partially reacted sodium sulphate from the liquid, and adding said partially reacted sodium sulphate to a fresh supply of solution in the first stage.

HARRY WHEELER MORSE.